United States Patent
Katsuki

(10) Patent No.: US 10,443,683 B2
(45) Date of Patent: Oct. 15, 2019

(54) BEARING AND ECCENTRICITY CORRECTION METHOD

(71) Applicant: FANUC CORPORATION, Yamanashi (JP)

(72) Inventor: Kyohei Katsuki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/128,875

(22) Filed: Sep. 12, 2018

(65) Prior Publication Data

US 2019/0078645 A1     Mar. 14, 2019

(30) Foreign Application Priority Data

Sep. 14, 2017    (JP) ................................ 2017-176252

(51) Int. Cl.
| | |
|---|---|
| F16C 33/58 | (2006.01) |
| F16F 15/32 | (2006.01) |
| F16C 33/60 | (2006.01) |
| F16C 23/10 | (2006.01) |
| F16C 19/06 | (2006.01) |
| G01M 1/30 | (2006.01) |
| F16C 35/04 | (2006.01) |

(52) U.S. Cl.
CPC ............ F16F 15/322 (2013.01); F16C 23/10 (2013.01); F16C 33/60 (2013.01); *F16C 19/06* (2013.01); *F16C 35/042* (2013.01); *G01M 1/30* (2013.01)

(58) Field of Classification Search
CPC ........ F16C 19/06; F16C 19/52; F16C 19/527; F16C 23/10; F16C 25/06; F16C 25/33; F16C 25/585; F16C 25/586; F16F 15/322
See application file for complete search history.

(56) References Cited

U.S. PATENT DOCUMENTS 4,364,613 A * 12/1982 Mangiavacchi ....... B60K 17/22
                                                        384/536
2011/0033146 A1* 2/2011 Shiraki ................... F16C 27/04
                                                      384/513

FOREIGN PATENT DOCUMENTS

| EP | 0911537 A1 | 4/1999 |
|---|---|---|
| JP | 10311375 A | 11/1998 |
| JP | 2001507107 A | 5/2001 |
| JP | 2005265124 A | 9/2005 |
| JP | 2005335455 A | 12/2005 |
| JP | 201090974 A | 4/2010 |
| WO | 9826190 A1 | 6/1998 |

OTHER PUBLICATIONS

English Abstract for Japanese Publication No. JPH10311375 A, published Nov. 24, 1998, 1 pg.

(Continued)

*Primary Examiner* — Phillip A Johnson
(74) *Attorney, Agent, or Firm* — Fredrikson & Byron, P.A.

(57) ABSTRACT

A bearing that rotatably supports a rotating shaft includes an inner wheel that supports the rotating shaft in a manner to be coaxial with the rotating shaft; an outer wheel provided radially outside the inner wheel; and a plurality of rolling bodies that are provided in a ring-shaped gap between the inner wheel and the outer wheel. The inner wheel is provided with a correcting section that corrects eccentric rotation of the rotating shaft.

7 Claims, 2 Drawing Sheets

(56) References Cited

OTHER PUBLICATIONS

English Abstract for Japanese Publication No. 2001507107 A, published May 29, 2001, 1 pg.
English Abstract and Machine Translation for Japanese Publication No. 2005-335455 A, published Dec. 8, 2005, 10 pgs.
English Abstract and Machine Translation for Japanese Publication No. 2005265124 A, published Sep. 29, 2005, 18 pgs.
English Abstract and Machine Translation for Japanese Publication No. 2010090974 A, published Apr. 22, 2010, 20 pgs.

* cited by examiner

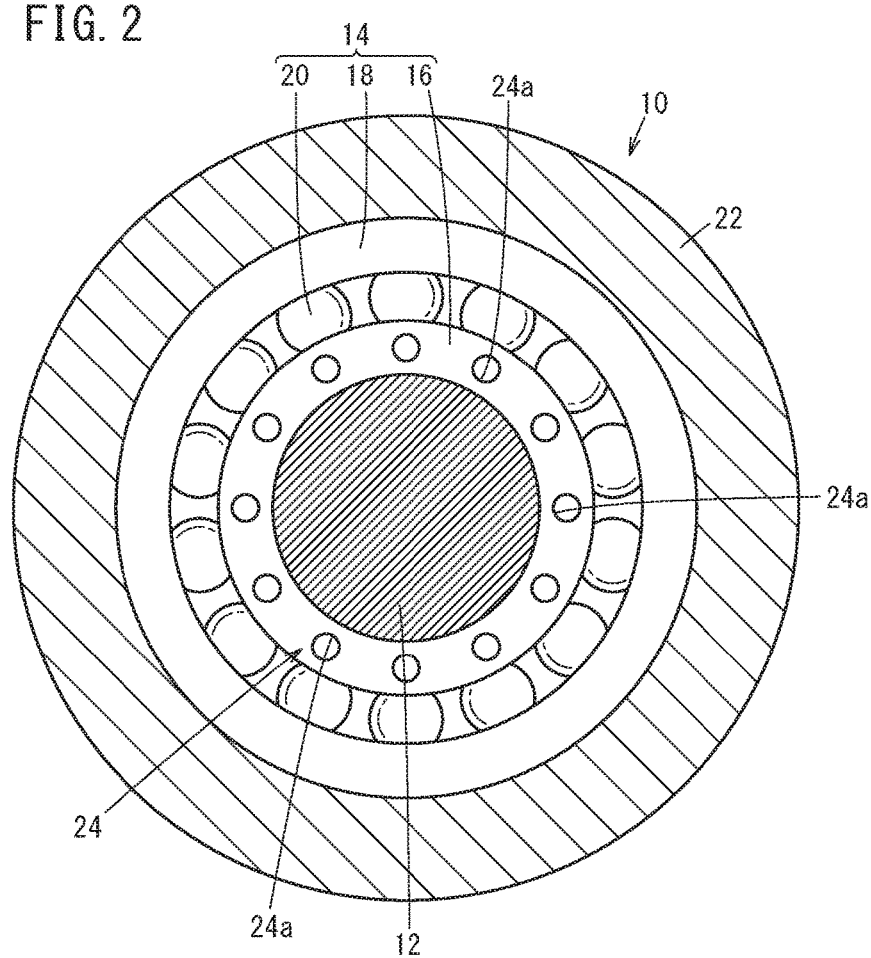

BEARING AND ECCENTRICITY CORRECTION METHOD

CROSS-REFERENCE TO RELATED APPLICATION

This application is based upon and claims the benefit of priority from Japanese Patent Application No. 2017-176252 filed on Sep. 14, 2017, the contents of which are incorporated herein by reference.

BACKGROUND OF THE INVENTION

Field of the Invention

The present invention relates to a bearing and an eccentricity correction method for correcting eccentric rotation of a rotating shaft.

Description of the Related Art

Japanese Laid-Open Patent Publication No. 10-311375 discloses attaching a balance ring, which has tapped holes arranged circumferentially and uniformly, to a rotor in order to correct the unbalance of a rotating structure.

SUMMARY OF THE INVENTION

However, in Japanese Laid-Open Patent Publication No. 10-311375, attaching the balance ring having the tapped holes arranged circumferentially and uniformly to the rotor results in an increase in the number of components and an increase in cost.

Therefore, it is an object of the present invention to provide a bearing and an eccentricity correction method for correcting the eccentric rotation of a rotating shaft at a low cost.

A first aspect of the present invention is a bearing (14) that rotatably supports a rotating shaft (12), the bearing comprising an inner wheel (16) that supports the rotating shaft in a manner to be coaxial with the rotating shaft; an outer wheel (18) provided radially outside the inner wheel; and a plurality of rolling bodies (20) that are provided in a ring-shaped gap between the inner wheel and the outer wheel, wherein the inner wheel is provided with a correcting section (24) that corrects eccentric rotation of the rotating shaft.

A second aspect of the present invention is an eccentricity correction method for correcting eccentricity of a rotational center of a rotating shaft (12) using a bearing (14) that rotatably supports the rotating shaft, wherein the bearing includes an inner wheel (16) that supports the rotating shaft in a manner to be coaxial with the rotating shaft; an outer wheel (18) provided radially outside the inner wheel; and a plurality of rolling bodies (20) that are provided in a ring-shaped gap between the inner wheel and the outer wheel; a plurality of holes (24a) are formed in the inner wheel in an axial direction of the rotating shaft, along a circumferential direction of the inner wheel; and a weight (26) is inserted into at least one hole among the plurality of holes, according to the eccentricity of the rotational center, to correct the eccentricity of the rotational center.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a cross-sectional view seen along the arrow line II-II of FIG. 1.

DESCRIPTION OF THE PREFERRED EMBODIMENTS

Figure 1:
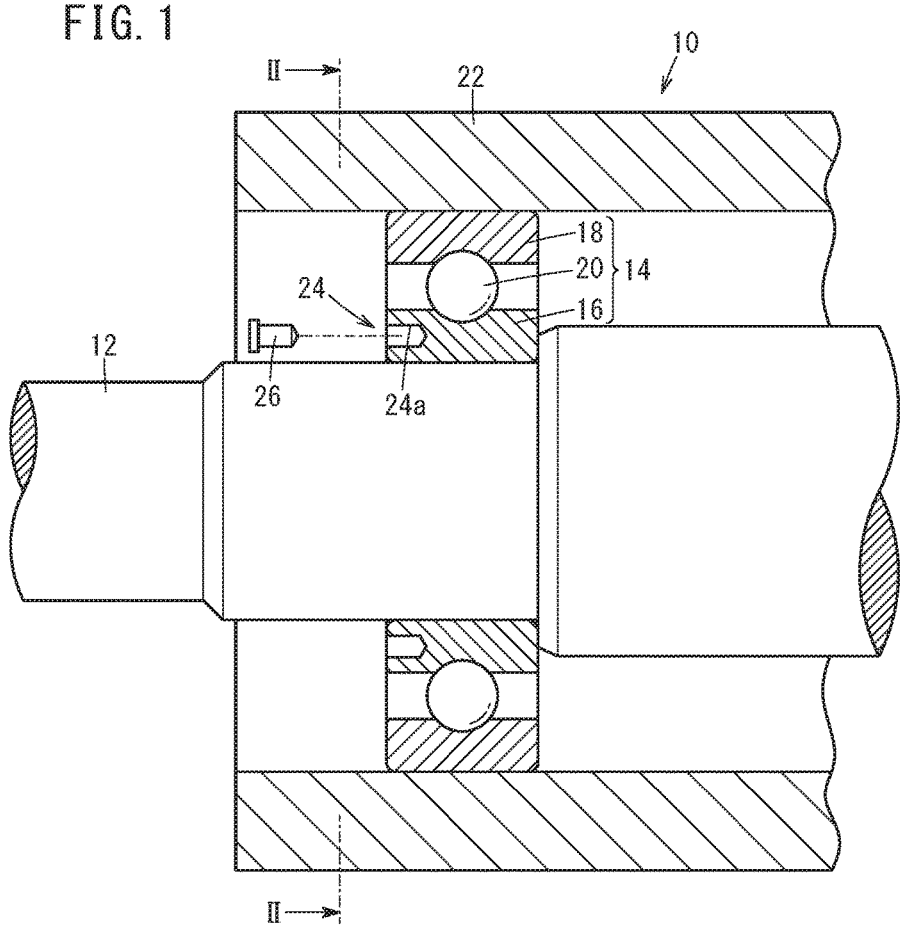
FIG. 1 is a cross-sectional view of a bearing that rotatably supports a rotating shaft of a motor.

A preferred embodiment of the bearing and the eccentricity correction method according to the present invention will be presented and described in detail below with reference to the accompanying drawings.

FIG. 1 is a cross-sectional view of a bearing 14 that rotatably supports a rotating shaft 12 of a motor 10, and FIG. 2 is a cross-sectional view seen along the arrow line II-II of FIG. 1.

The bearing 14 includes an inner wheel 16, an outer wheel 18 provided radially outside the inner wheel 16, and a plurality of rolling bodies 20 provided in a ring-shaped gap between the inner wheel 16 and the outer wheel 18. The inner wheel 16 is connected to a rotating shaft 12 in a manner to be coaxial with the rotating shaft 12. In other words, the inner wheel 16 supports the rotating shaft 12 such that the center of the rotating shaft 12 and the center of the inner wheel 16 form concentric circles. The inner wheel 16 engages with the outer circumferential surface of the rotating shaft 12. The inner wheel 16 is capable of rotating on the axis of the rotating shaft 12, relative to the outer wheel 18. The outer wheel 18 is supported by a housing 22 of the motor 10, such that rotation on the axis of the rotating shaft 12 is impossible.

The inner wheel 16 is provided with a correcting section 24 that corrects the eccentric rotation of the rotating shaft 12. In other words, the correcting section 24 corrects the eccentricity of the rotational center of the rotating shaft 12.

The correcting section 24 is configured as a plurality of holes 24a that are formed in the inner wheel 16 along the axial direction of the rotating shaft 12. The plurality of holes 24a are arranged along the circumferential direction of the inner wheel 16. The plurality of holes 24a are preferably arranged in a circle concentric with the inner wheel 16 and at uniform intervals. By arranging the plurality of holes 24a in a circle concentric with the inner wheel 16 and at uniform intervals, it is possible to prevent the plurality of holes 24a from affecting the rotational balance of the rotating shaft 12. These holes 24a may be tapped holes that have screws screwed therein.

A weight 26 is inserted into at least one of the plurality of holes 24a of the inner wheel 16, according to the eccentricity of the rotational center of the rotating shaft 12 (i.e. the eccentric rotation of the rotating shaft 12). By actually rotating the rotating shaft 12, it is possible to measure the eccentricity of the rotational center of the rotating shaft 12.

Due to misalignment between the position of the center of mass of the rotating shaft 12 and inner wheel 16 and the position of the rotational center of the rotating shaft 12, the rotational center of the rotating shaft 12 becomes eccentric and the rotation of the rotating shaft 12 becomes unbalanced. Therefore, by inserting the weight 26 into at least one of the plurality of holes 24a, it is possible to match the position of the center of mass of the rotating shaft 12 and inner wheel 16 with the position of the rotational center of the rotating shaft 12. In this way, the eccentricity of the rotational center of the rotating shaft 12 (i.e. the eccentric rotation of the rotating shaft 12) is corrected, and it is possible to prevent the rotational center from becoming eccentric (i.e. eccentric rotation of the rotating shaft 12).

If the holes 24a are tapped holes, it is only necessary for a screw to be screwed into a hole 24a as the weight 26.

Since there is no need to provide a balance ring such as in the conventional art, the number of components is decreased. Accordingly, it is possible to accurately correct the eccentric rotation of the rotating shaft 12 at a low cost.

In the present embodiment, the bearing 14 is provided to the motor 10 and rotatably supports the rotating shaft 12 of the motor 10, but the bearing 14 may rotatably support a rotating shaft 12 other than the rotating shaft 12 of the motor 10. In such a case, the eccentric rotation of the rotating shaft 12 other than the rotating shaft 12 of the motor 10 is corrected by the bearing 14.

[Technical Ideas Obtained From The Embodiments]

The following is a description of technical ideas that can be understood from the embodiments described above <First Technical Idea>

The bearing (14) rotatably supports the rotating shaft (12). The bearing (14) includes the inner wheel (16) that supports the rotating shaft (12) in a manner to be coaxial with the rotating shaft (12), the outer wheel (18) provided radially outside the inner wheel (16), and the plurality of rolling bodies (20) that are provided in a ring-shaped gap between the inner wheel (16) and the outer wheel (18). The inner wheel (16) is provided with the correcting section (24) that corrects the eccentric rotation of the rotating shaft (12).

In this way, the number of components is not increased, and it is possible to accurately correct the eccentric rotation of the rotating shaft (12) while keeping the cost low.

The correcting section (24) may be a plurality of holes (24a) formed in the inner wheel (16) along the axial direction of the rotating shaft (12). In this way, the eccentric rotation of the rotating shaft (12) can be corrected easily and accurately.

The plurality of holes (24a) may be arranged along the circumferential direction of the inner wheel (16). In this way, the effect that the plurality of holes (24a) formed in the bearing (14) have on the rotational balance of the rotating shaft (12) can be restricted.

The plurality of holes (24a) may be arranged in a circle concentric with the inner wheel (16) and at uniform intervals. In this way, the effect that the plurality of holes (24a) have on the rotational balance of the rotating shaft (12) can be restricted.

The bearing (14) may be provided to the motor (10) and rotatably support the rotating shaft (12) of the motor (10).

<Second Technical Idea>

The eccentric correction method includes using the bearing (14) that rotatably supports the rotating shaft (12) to correct the eccentricity of the rotational center of the rotating shaft (12). The bearing (14) includes the inner wheel (16) that supports the rotating shaft (12) in a manner to be coaxial with the rotating shaft (12), the outer wheel (18) provided radially outside the inner wheel (16), and the plurality of rolling bodies (20) that are provided in a ring-shaped gap between the inner wheel (16) and the outer wheel (18). The plurality of holes (24a) are formed in the inner wheel (16) in the axial direction of the rotating shaft (12), along the circumferential direction of the inner wheel (16). A weight (26) is inserted into at least one hole (24a) among the plurality of holes (24a), according to the eccentricity of the rotational center, to correct the eccentricity of the rotational center.

In this way, the number of components is not increased, and it is possible to accurately correct the eccentric rotation of the rotating shaft (12) while keeping the cost low.

Furthermore, the effect that the plurality of holes (24a) formed in the bearing (14) have on the rotational balance of the rotating shaft (12) can be restricted.

The plurality of holes (24a) may be arranged in a circle concentric with the inner wheel (16) and at uniform intervals. In this way, the effect that the plurality of holes (24a) have on the rotational balance of the rotating shaft (12) can be restricted.

The eccentricity correction method corrects the eccentricity of the rotational center of the rotating shaft (12) of the motor (10).

The present invention is not limited to the above-described embodiment, and various modifications can be made without departing from the gist of the present invention.

What is claimed is:

1. A bearing that rotatably supports a rotating shaft, the bearing comprising:
    an inner wheel that supports the rotating shaft in a manner to be coaxial with the rotating shaft;
    an outer wheel provided radially outside the inner wheel; and
    a plurality of rolling bodies that are provided in a ring-shaped gap between the inner wheel and the outer wheel, wherein
    the inner wheel is provided with a correcting section that corrects eccentric rotation of the rotating shaft, wherein
    the correcting section is a plurality of holes formed in the inner wheel along an axial direction of the rotating shaft.

2. The bearing according to claim 1, wherein the plurality of holes are arranged along a circumferential direction of the inner wheel.

3. The bearing according to claim 2, wherein the plurality of holes are arranged in a circle concentric with the inner wheel and at uniform intervals.

4. The bearing according to claim 1, wherein the bearing is provided to a motor, and rotatably supports the rotating shaft of the motor.

5. An eccentricity correction method for correcting eccentricity of a rotational center of a rotating shaft using a bearing that rotatably supports the rotating shaft, wherein:
    the bearing includes:
        an inner wheel that supports the rotating shaft in a manner to be coaxial with the rotating shaft;
        an outer wheel provided radially outside the inner wheel; and
        a plurality of rolling bodies that are provided in a ring-shaped gap between the inner wheel and the outer wheel;
    a plurality of holes are formed in the inner wheel in an axial direction of the rotating shaft, along a circumferential direction of the inner wheel; and
    a weight is inserted into at least one hole among the plurality of holes, according to the eccentricity of the rotational center, to correct the eccentricity of the rotational center.

6. The eccentricity correction method according to claim 5, wherein the plurality of holes are arranged in a circle concentric with the inner wheel and at uniform intervals.

7. The eccentricity correction method according to claim 5, comprising:
    correcting the eccentricity of the rotational center of the rotating shaft of a motor.

* * * * *